United States Patent
Davis (10) Patent No.: US 10,280,799 B2
(45) Date of Patent: May 7, 2019

(54) BLADE OUTER AIR SEAL ASSEMBLY WITH POSITIONING FEATURE FOR GAS TURBINE ENGINE

(71) Applicant: United Technologies Corporation, Farmington, CT (US)

(72) Inventor: Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 390 days.

(21) Appl. No.: 15/178,896

(22) Filed: Jun. 10, 2016

(65) Prior Publication Data

US 2017/0356309 A1 Dec. 14, 2017

(51) Int. Cl.
| | |
|---|---|
| *F01D 25/24* | (2006.01) |
| *F01D 5/02* | (2006.01) |
| *F01D 5/12* | (2006.01) |
| *F01D 11/08* | (2006.01) |

(52) U.S. Cl.
CPC ............ *F01D 25/246* (2013.01); *F01D 5/02* (2013.01); *F01D 5/12* (2013.01); *F01D 11/08* (2013.01); *F05D 2220/32* (2013.01); *F05D 2230/60* (2013.01); *F05D 2240/11* (2013.01); *Y02T 50/672* (2013.01)

(58) Field of Classification Search
CPC ... F01D 5/02; F01D 5/12; F01D 11/08; F01D 25/246
USPC ...................................................... 415/170.1
See application file for complete search history.

(56) References Cited

U.S. PATENT DOCUMENTS

| | | | | |
|---|---|---|---|---|
| 6,170,831 B1 * | 1/2001 | Bouchard | ............. | F01D 11/005 277/355 |
| 6,997,673 B2 * | 2/2006 | Morris | ...................... | F01D 9/04 415/1 |
| 7,704,039 B1 * | 4/2010 | Liang | ........................ | F01D 9/04 415/116 |

(Continued)

FOREIGN PATENT DOCUMENTS

| | | |
|---|---|---|
| EP | 3219928 | 9/2017 |
| WO | 2015038341 | 3/2015 |

(Continued)

OTHER PUBLICATIONS

Extended European Search Report for Application No. EP 17175482.3 dated Oct. 26, 2017.

*Primary Examiner* — Timothy L Maust
(74) *Attorney, Agent, or Firm* — Carlson, Gaskey & Olds, P.C.

(57) ABSTRACT

A seal assembly for a gas turbine engine according to an example of the present disclosure includes, among other things, a seal arc segment that has a sealing portion and a first interface portion. The first interface portion defines circumferential mate faces. A support includes a mounting portion and a second interface portion. The mounting portion is configured to be fixedly attached to an engine static structure, and the second interface portion is radially inward of the first interface portion. At least one positioning member is dimensioned to abut the first and second interface portions such that the first and second interface portions are spaced apart by a predetermined distance in a radial direction.

22 Claims, 6 Drawing Sheets

(56) References Cited

U.S. PATENT DOCUMENTS

| | | | | |
|---|---|---|---|---|
| 8,303,247 | B2 * | 11/2012 | Schlichting | F01D 11/122 |
| | | | | 29/424 |
| 8,439,636 | B1 * | 5/2013 | Liang | F01D 25/246 |
| | | | | 415/173.1 |
| 9,039,358 | B2 | 5/2015 | Tholen et al. | |
| 9,587,504 | B2 * | 3/2017 | McCaffrey | F01D 11/08 |
| 9,833,869 | B2 * | 12/2017 | Lutjen | F01D 11/12 |
| 9,869,202 | B2 * | 1/2018 | Lutjen | F01D 11/08 |
| 9,879,557 | B2 * | 1/2018 | Hall | F01D 11/005 |
| 10,001,022 | B2 * | 6/2018 | Strock | F01D 11/003 |
| 2007/0048128 | A1 * | 3/2007 | Cunha | B23P 15/00 |
| | | | | 415/170.1 |
| 2015/0345319 | A1 | 12/2015 | Zelesky et al. | |
| 2016/0032754 | A1 | 2/2016 | McCaffrey | |
| 2016/0053624 | A1 | 2/2016 | McCaffrey et al. | |
| 2016/0084101 | A1 | 3/2016 | McCaffrey | |

FOREIGN PATENT DOCUMENTS

| | | |
|---|---|---|
| WO | 2015047478 | 4/2015 |
| WO | 2015088656 | 6/2015 |
| WO | 2015109292 | 7/2015 |
| WO | 2015112354 | 7/2015 |

\* cited by examiner

BLADE OUTER AIR SEAL ASSEMBLY WITH POSITIONING FEATURE FOR GAS TURBINE ENGINE

BACKGROUND

This disclosure generally relates to positioning of components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged.

SUMMARY

A seal assembly for a gas turbine engine according to an example of the present disclosure includes a seal arc segment that has a sealing portion and a first interface portion. The first interface portion defines circumferential mate faces. A support includes a mounting portion and a second interface portion. The mounting portion is configured to be fixedly attached to an engine static structure, and the second interface portion is radially inward of the first interface portion. At least one positioning member is dimensioned to abut the first and second interface portions such that the first and second interface portions are spaced apart by a predetermined distance in a radial direction.

In a further embodiment of any of the foregoing embodiments, the predetermined distance relates to a stacking tolerance defined in the radial direction by the seal arc segment and the support.

In a further embodiment of any of the foregoing embodiments, at least one positioning member extends substantially between the mate faces.

In a further embodiment of any of the foregoing embodiments, the at least one positioning member is a first positioning member and a second positioning member, and each of the first and second positioning members extends less than half a distance between the mate faces.

In a further embodiment of any of the foregoing embodiments, the first positioning member defines a first radial thickness, and the second positioning member defines a second, different radial thickness.

In a further embodiment of any of the foregoing embodiments, the at least one positioning member includes a retention member extending from an elongated body, and the second interface portion defines a retention cavity configured to receive the retention member. The retention cavity is dimensioned to bound relative circumferential movement of the retention member.

In a further embodiment of any of the foregoing embodiments, the first interface portion is a first hook support, and the second interface portion is a second hook support dimensioned to mate with the with the first hook support.

In a further embodiment of any of the foregoing embodiments, the predetermined distance varies in a circumferential direction.

A gas turbine engine according to an example of the present disclosure includes an engine case extending along an engine axis, an array of blades rotatable about the engine axis, and a blade outer air seal assembly adjacent to the array of blades. The blade outer air seal assembly includes an array of blade outer air seals each having a sealing portion and a first interface portion. The sealing portion is configured to bound a core flow path. An array of supports each include a mounting portion and a second interface portion. The mounting portion is configured to be fixedly attached to the engine case, and the second interface portion bounds radial movement of an adjacent one of the first interface portions towards the engine axis. A plurality of positioning members are each received between one of the first and second interface portions such that the corresponding sealing portion is radially spaced from the engine axis by a predetermined distance.

In a further embodiment of any of the foregoing embodiments, the predetermined distance relates to a radial stacking tolerance defined by the engine case and the blade outer air seal assembly.

In a further embodiment of any of the foregoing embodiments, the predetermined distance relates to a clearance gap between one of the array of blade outer air seals and an adjacent one of the array of blades.

In a further embodiment of any of the foregoing embodiments, the predetermined distance of at least one of the array of blade outer air seals varies in a circumferential direction relative to the engine axis.

In a further embodiment of any of the foregoing embodiments, the array of blade outer air seals includes a first seal and a second seal, the predetermined distance of the first seal differing from the predetermined distance of the second seal.

In a further embodiment of any of the foregoing embodiments, the array of blade outer air seals is arranged such that a cross section of the core flow path taken relative to the engine axis has a non-circular elliptical geometry.

In a further embodiment of any of the foregoing embodiments, the first interface portion is a first hook support, and the second interface portion is a second hook support dimensioned to mate with the with the first hook support.

In a further embodiment of any of the foregoing embodiments, one of the array of blade outer air seals includes a third interference portion axially aft of the first interface portion, one of the array of supports includes a fourth interface portion bounding radial movement of the third interface portion towards the engine axis, and a second positioning member is received between the third and fourth interface portions. A thickness of the second positioning member is different from a thickness of a corresponding one of the plurality of positioning members positioned adjacent to the first interface portion.

A method of sealing of a gas turbine engine according to an example of the present disclosure includes providing a blade outer air seal that has a sealing portion and a first interface portion. The sealing portion is configured to bound a flow path providing a support including a mounting portion and a second interface portion. The second interface portion is configured to bound radial movement of the first interface portion toward an engine axis attaching the mounting portion to an engine case. The engine case is arranged about the engine axis. The method includes situating a positioning member between the first and second interface portions such that the sealing portion is radially spaced from the engine axis by a predetermined distance.

In a further embodiment of any of the foregoing embodiments, the predetermined distance relates to a radial stacking tolerance defined by the engine case, the blade outer air seal and the support.

In a further embodiment of any of the foregoing embodiments, the positioning member is dimensioned such that the predetermined distance varies in a circumferential direction relative to the engine axis.

A further embodiment of any of the foregoing embodiments includes slideably moving the first interface portion relative to the second interface portion to secure the blade outer air seal to the support.

The various features and advantages of this invention will become apparent to those skilled in the art from the following detailed description of an embodiment. The drawings that accompany the detailed description can be briefly described as follows.

DETAILED DESCRIPTION

Figure 1:
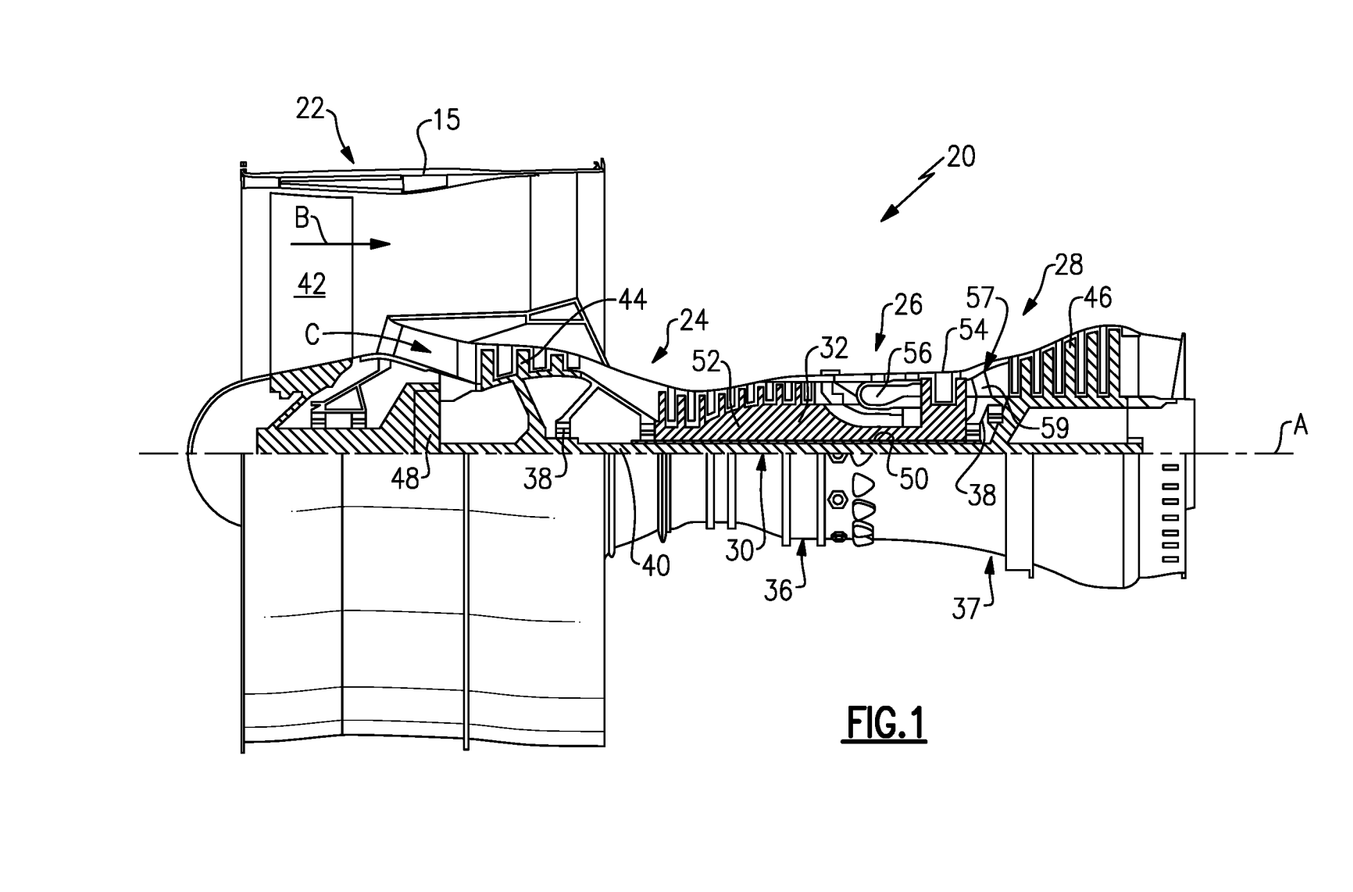
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
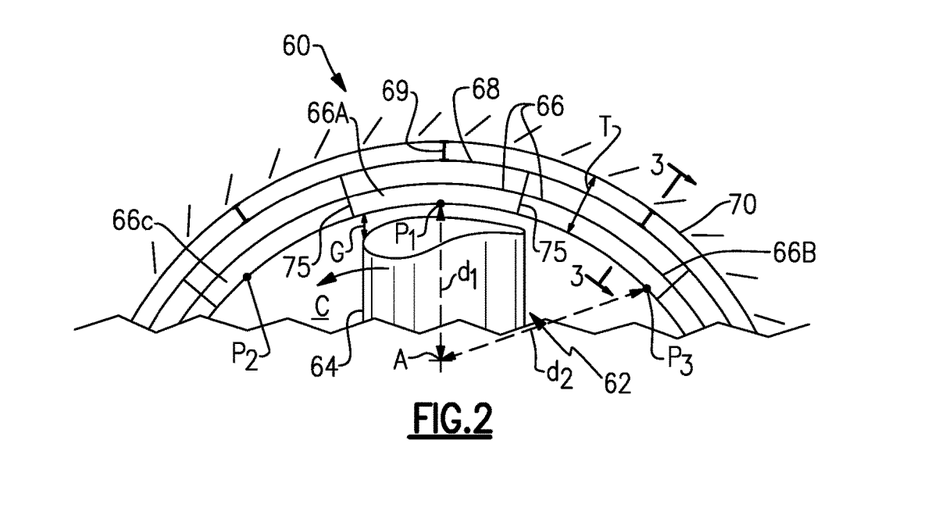
FIG. 2 illustrates an axial view of an example of a blade outer air seal assembly of a gas turbine engine.

FIG. 2 illustrates an axial view through a portion of one of the stages of the turbine section 28. In this disclosure, like reference numerals designate like elements where appropriate and reference numerals with the addition of one-hundred or multiples thereof designate modified elements that are understood to incorporate the same features and benefits of the corresponding original elements. The turbine section 28 includes an annular seal assembly 60 that is located radially outwards of a rotor 62 that has a row of rotor blades 64. The seal assembly 60 can alternatively or additionally be adapted for other portions of the engine 20, such as an upstream stage of the compressor section 24 or combustor panels defining portions of a combustion chamber located in the combustor section 26. Although the teachings herein primarily refer to a two spool gas turbine engine having a fan, other systems can benefit from the teachings herein, such as military engines with or without a fan, and ground based systems.

The seal assembly 60 includes one or more blade outer air seals (BOAS) or seal arc segments 66 that are circumferentially arranged in an annulus around the engine axis A of the engine 20. The seal arc segments 66 are mounted to a support 68, which may be continuous or segmented. The support 68 is mounted through one or more connections 69 to an engine case 70, which is arranged about the engine axis A. In alternative examples, the seal arc segments 66 are directly attached to the engine case 70. Each seal arc segment 66 can be formed of a material having a high temperature capability. Example high temperature materials include metallic alloys and ceramic-based materials, such as a monolithic ceramic or a ceramic matrix composite. One example of a high temperature metallic alloy is a nickel-based alloy. Monolithic ceramics may be, but are not limited to, silicon carbide (SiC) or silicon nitride ($Si_3N_4$). Alternatively, each seal arc segment 66 may be formed of high-toughness material such as, but not limited to, single crystal metallic alloys.

The seal assembly 60 is in close radial proximity to the tips of the blades 64 to reduce the amount of gas flow that escapes around the blades 64 and through clearance gap G. The engine 20 can include an active or passive clearance control system to adjust the clearance gap G to a desired dimension during one or more operating conditions of the engine 20. The clearance gap G may also vary during operation of the engine 20, such as between a non-operating, cold state condition, a cruise condition and/or a takeoff condition.

The various components of the seal assembly 60 and engine case 70 define a radial stacking tolerance T in a radial direction relative to the engine axis A. For the purposes of this disclosure, the term "stacking tolerance" means a sum of deviations from ideal design dimensions of an identified number of components relative to a particular position. The deviations may correspond to variations in the manufacturing process, for example, and are typically expressed as tolerances. Because of these variations, measured radial positions of the components may be substantially the same or may vary at different circumferential positions relative to the engine axis A.

Figure 3:
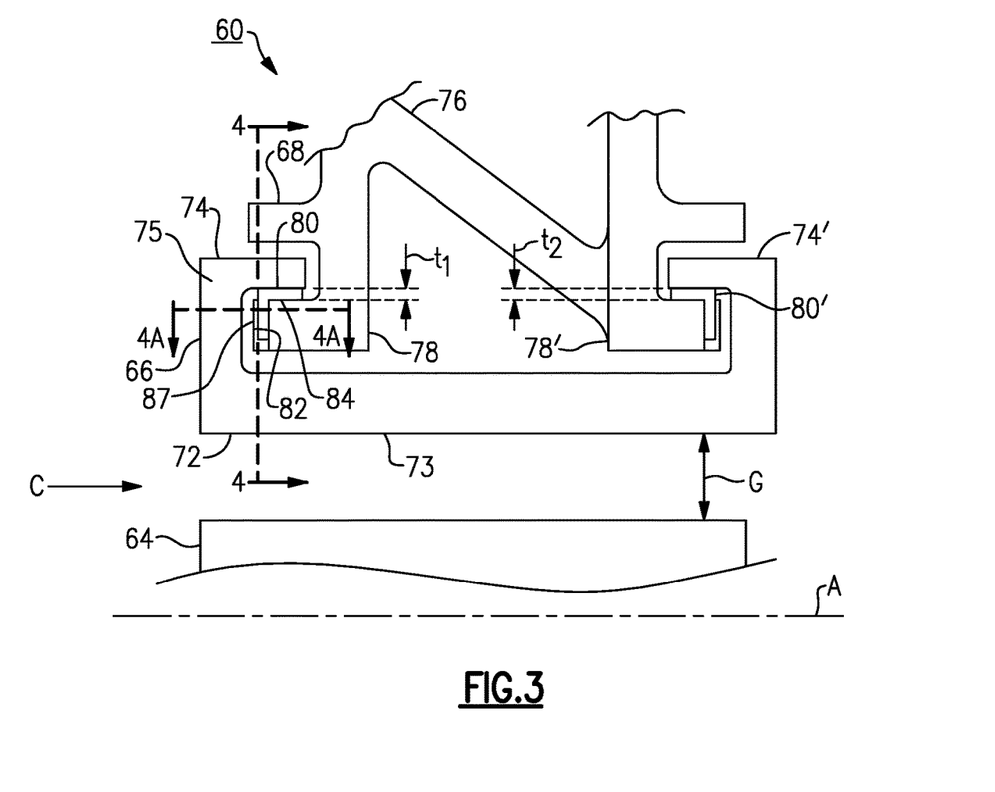
FIG. 3 illustrates a cross sectional view of selected portions of the seal assembly of FIG. 2 taken along line 3-3.
Figure 4:
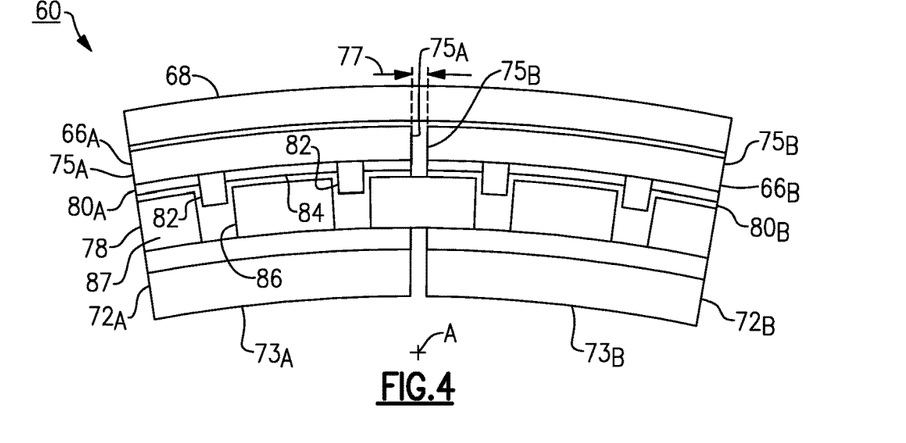
FIG. 4 illustrates an axial view of selected portions of the seal assembly of FIG. 3 taken along line 4-4.

Referring to FIG. 3, with continued reference to FIG. 2, an axial cross sectional view of seal assembly 60 is shown. FIG. 4 illustrates a circumferential cross sectional view of two adjacent seal arc segments $66_A$, $66_B$ of seal assembly 60. Each seal arc segment 66 includes a sealing portion 72 and a first interface portion 74, with the interface portion 74 defining circumferential mate faces 75. Each seal arc segment 66 has generally arcuate sealing surfaces 73 bounding portions of the core flow path C.

The support 68 includes a mounting portion 76 and a second interface portion 78. The mounting portion 76 is configured to be fixedly attached or otherwise secured to an engine static structure, such as the engine case 70. In the illustrated example, each of the first and second interface portions 74, 78 is a hook support dimensioned to mate with each other to secure the seal arc segment 66 to the engine case 70. The second interface portion 78 is radially inward of, and axially overlaps with, the first interface portion 74 such that the second interface portion 78 bounds radial movement of the first interface portion 74 towards the engine axis A. The first and second interface portions 74, 78 can be slideably moved in a circumferential direction relative to each other to secure the seal arc segment 66 to the support 68.

The seal assembly 60 includes at least one positioning member 80 situated or received between the first and second interface portions 74, 78. The positioning member 80 includes one or more retention members 82 extending from an elongated body 84. The elongated body 84 can be dimensioned to extend substantially between, or may be spaced apart from, the mate faces 75 of the first interface portion 74. The positioning member 80 can be substantially rigid, and can be formed from stamped sheet metal or a high temperature alloy. In other examples, the positioning member 80 is made of a high wear-resistant material, such as a cobalt-based alloy, to reduce wear of the second interface portion 78 of the support 68 otherwise caused by direct interaction with the first interface portion 74 of seal arc segment 66 which can be made of relatively harder material than the support 68.

Figure 5A:
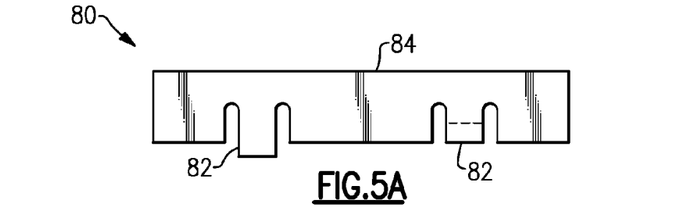
FIG. 5A illustrates a plan view of an example positioning member.
Figure 5B:
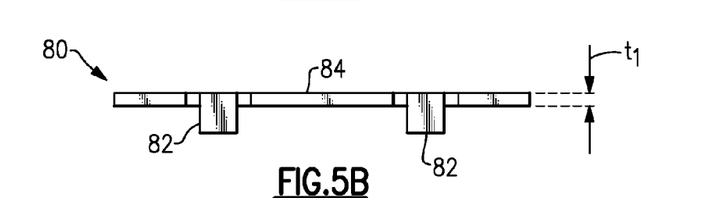
FIG. 5B illustrates a side view of the example positioning member of FIG. 5A.
Figure 6A:
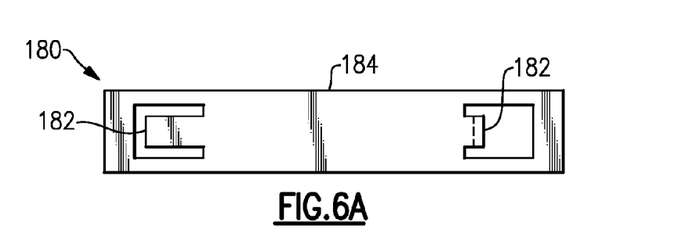
FIG. 6A illustrates a plan view of a positioning member according to a second example.
Figure 6B:
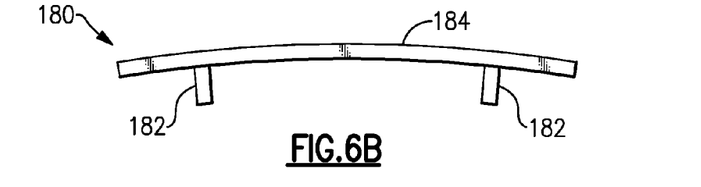
FIG. 6B illustrates a side view of the example positioning member of FIG. 6A.
Figure 10A:
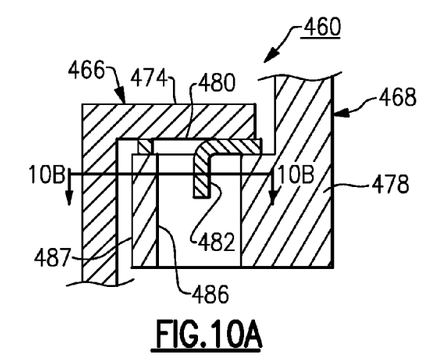
FIG. 10A illustrates a cross sectional view of selected portions of a seal assembly according to a fourth example.
Figure 10B:
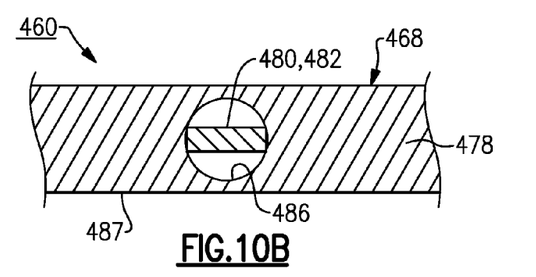
FIG. 10B illustrates a plan view of selected portions of the seal assembly of FIG. 10A taken along line 10B-10B.
Figure 10C:
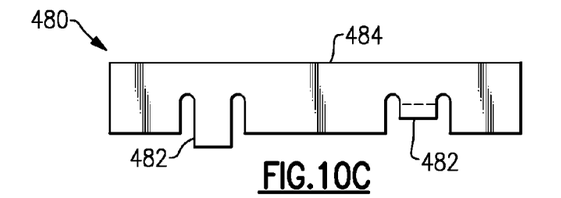
FIG. 10C illustrates a plan view of an example positioning member.
Figure 10D:
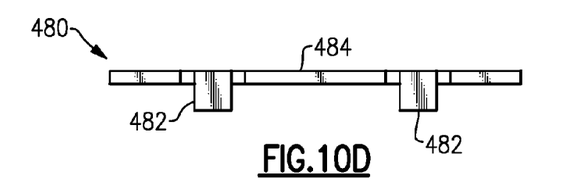
FIG. 10D illustrates a side view of the example positioning member of FIG. 10D.

The positioning member 80 can be formed such that a width of retention members 82 extends in the circumferential direction (FIG. 5A). The retention members 82 can be arranged or bent to a desired orientation such that the retention members 82 are transverse to the elongated body 84 (right retention tab 82 of FIG. 5A and both of FIG. 5B). In the example of FIGS. 6A and 6B, positioning member 180 includes retention members 182 stamped from elongated body 184 and having a width that extends in the axial direction (left member 182 of FIG. 6A unbent, and right member 82 bent). The positioning member 180 of FIGS. 6A and 6B may be utilized in combination with support 468 of FIGS. 10A-10B, for example. In alternative examples, the positioning member 80 is formed by another technique, such as direct metal laser sintering (DMLS).

Figure 4A:
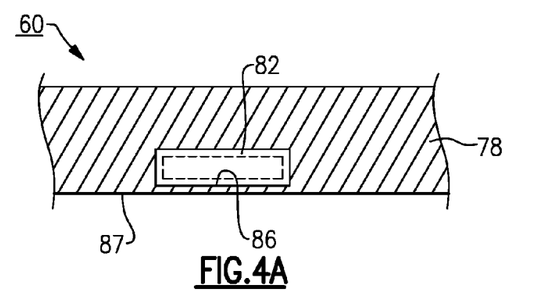
FIG. 4A illustrates a plan view of selected portions of the seal assembly of FIG. 3 taken along line 4A-4A.

The second interface portion 78 of the support 68 defines one or more retention cavities 86 defined in the second interface portion 78. In the illustrated example of FIG. 4A, the retention cavity 86 is a hole spaced from circumferential face 87 of the second interface portion 78 (retention member 82 shown in dashed line). Each retention cavity 86 is configured to receive one of the retention members 82. The retention cavity 86 is dimensioned to bound relative axial and circumferential movement of the retention member 82 within the retention cavity 86. In alternative examples, the retention members 82 are posts configured to be received within bores defined by the second interface portion 78.

The positioning member 80 is dimensioned to abut the first and second interface portions 74, 78. The positioning member 80 can be dimensioned such that the positioning member 80 is trapped radially, axially and circumferentially between the first and second interface portions 74, 78.

A thickness $t_1$ of the positioning member 80 is defined such that the first and second interface portions 74, 78 are spaced apart in the radial direction. The thickness $t_1$ can be defined such that the sealing portion 72 of the seal arc segment 66 is radially spaced from the engine axis A by a predetermined distance $d_1$ at a circumferential position $P_1$ along the sealing surfaces 73 of the seal arc segment 66 (FIG. 2). The predetermined distance $d_1$ can relate to the radial stacking tolerance T of the components. The predetermined distance $d_1$ can relate to a desired dimension of the clearance gap G between the seal arc segment 66 and the blades 64, such as for an aerodynamic design point (ADP) of the turbine section 28 or engine 20. The ADP may be defined at a cruise condition or a takeoff condition, for example. The desired dimension of the clearance gap G may be selected to reduce an overall loss of gas flow through the clearance gap G, thereby improving turbine efficiency. In one example, the radial stacking tolerance T is +/−0.005 inches, and the thickness $t_1$ is in a range of 0.010 to 0.020 inches, or 0.015-0.025 inches.

The thickness $t_1$ of one or more of the positioning members 80 can be dimensioned such that the predetermined distance varies in a circumferential direction, such as at circumferential positions $P_1$, $P_2$ and $P_3$ defined along sealing surfaces 73 of the seal arc segments $66_A$, $66_B$ and $66_C$ (FIG. 2). For example, the predetermined distance $d_1$ defined between seal arc segment $66_A$ and the engine axis A may differ from the predetermined distance $d_2$ defined by adjacent seal arc segment $66_B$ (FIG. 2).

A positioning member 80' can be situated between first interface portion 74' of the seal arc segment 66 and second interface portion 78' of the support 68. A thickness $t_2$ of positioning member 80' can be the same as, or differ from, the thickness $t_1$ of the positioning member 80 to establish a predetermined distance for different axial positions relative to the engine axis A.

Figure 7:
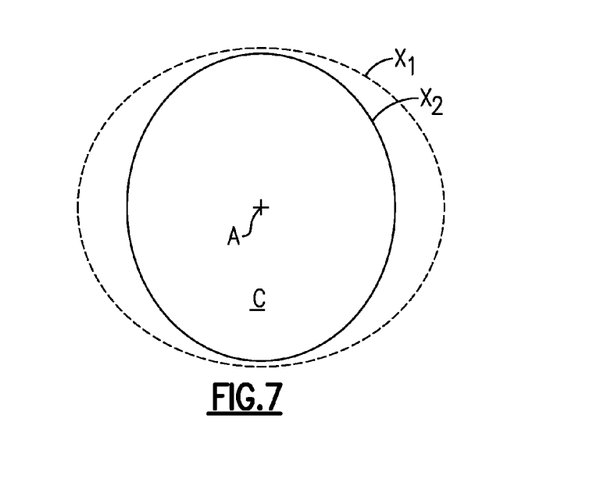
FIG. 7 illustrates a schematic cross section view of two flow path profiles.

Referring to FIG. 7, the blade outer air seal assembly 60 can be arranged to reduce the overall loss of gas flow through the clearance gap G based on expected operating conditions of the engine 20. The thickness $t_1$, $t_2$ (FIG. 3) of one or more of the positioning members 80, 80' can be dimensioned according to a first predetermined cross sectional profile $X_1$ of the core flow path C taken relative to the engine axis A.

The first predetermined cross sectional profile $X_1$ may relate to a second predetermined cross sectional profile $X_2$, each defined by sealing surfaces 73 of the seal arc segments 66 at different operating conditions of the turbine section 28 or engine 20. For example, the first predetermined cross sectional profile $X_1$ may be defined at a first operating condition, such as a non-operating, cold state condition, and the second predetermined cross sectional profile $X_2$ may be defined at a second operating condition such as ADP. Operation of the engine 20 may cause the relative position of the sealing surfaces 73 to transition between the first and second predetermined cross sectional profiles $X_1$, $X_2$. In the illustrated example, the first predetermined cross sectional profile $X_1$ has a non-circular elliptical geometry, and the second predetermined cross sectional profile $X_2$ has a substantially circular geometry. Utilizing the techniques described herein, the overall loss of gas flow through the clearance gap G during engine operation can be reduced. The first predetermined cross sectional profile $X_1$ can be selected to account for expected distortion or out-of-roundness of the engine case 70 caused by mechanical, thermal and/or aerodynamic loading during operation of the engine 20, or by operation of a clearance control system, for example.

Figure 8:
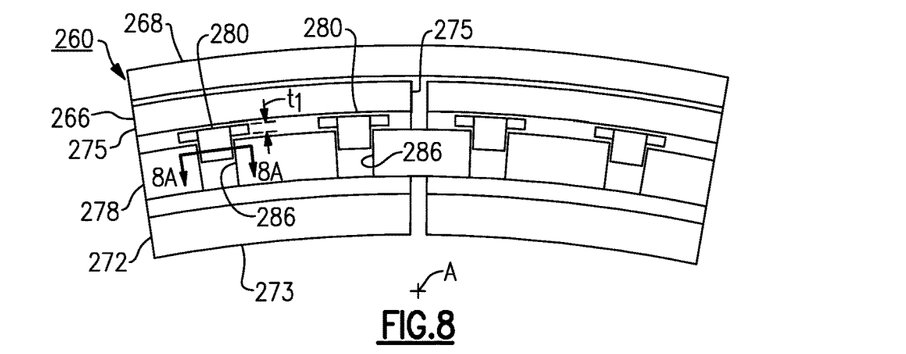
FIG. 8 illustrates an axial view of a seal assembly according to a second example.
Figure 8A:
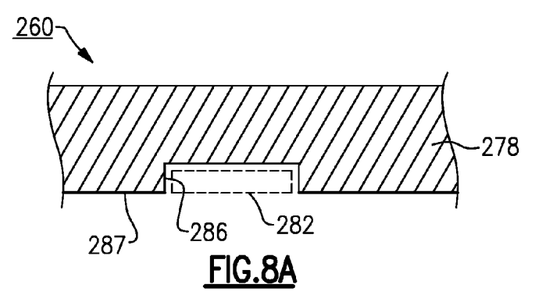
FIG. 8A illustrates a plan view of selected portions of the seal assembly of FIG. 8 taken along line 8A-8A.

FIG. 8 illustrates a seal assembly 260 according to a second example. The seal assembly 260 includes a plurality of positioning members 280 each received in a corresponding retention cavity 286 of support 268. In the illustrated example of FIG. 8A, the retention cavities 286 are slots defined in circumferential face 287 of the second interface portion 278 (retention member 282 shown in dashed line). Each of the positioning members 280 extends less than half a distance between mate faces 275 of seal arc segment 266. In some examples, a thickness $t_1$ of the positioning members 280 is the same. In other examples, the thicknesses $t_1$ of adjacent positioning members 280 differ from each other such that a different predetermined distance can be defined at two or more circumferential positions of the sealing surfaces 273 of the corresponding seal arc member 266, which may cause the seal arc member 266 to be circumferentially tilted relative to the engine axis A.

Figure 9:
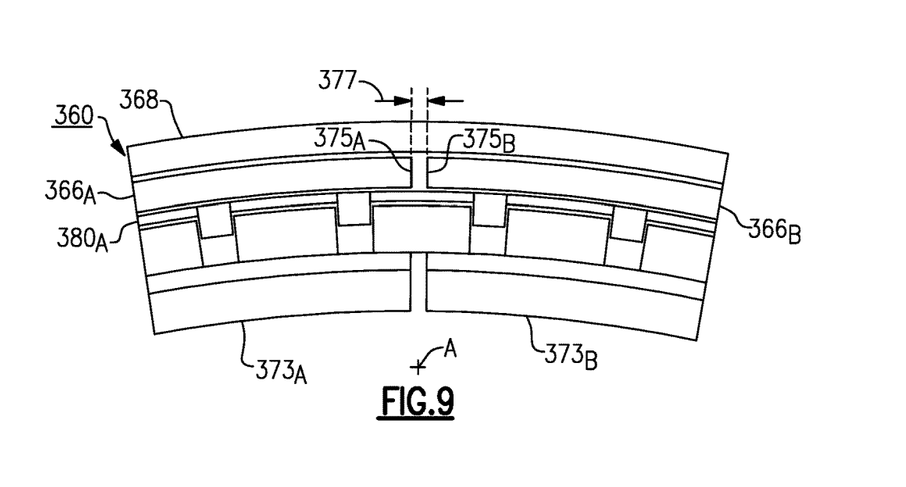
FIG. 9 illustrates an axial view of a seal assembly according to a third example.

FIG. 9 illustrates a seal assembly 360 according to a third example. Positioning member 380 is dimensioned to span across an intersegment gap 377 defined by mate faces $375_A$, $375_B$ of adjacent seal arc segments $366_A$, $366_B$. The positioning member 380 is dimensioned such that a predetermined distance between sealing surfaces $373_A$ and the engine axis A is substantially the same as a predetermined distance between sealing surfaces $373_B$ and the engine axis A. The positioning member 380 can be formed as a full hoop or as one or more segments each spanning at least one intersegment gap 377.

FIGS. 10A to 10D illustrate a seal assembly 460 according to a fourth example. Positioning member 480 includes one or more retention members 482 (one shown) having a generally rectangular cross sectional profile. Retention cavity 486 is shaped as a hole having a generally elliptical cross sectional profile and is dimensioned to receive a corresponding one of the retention members 482 such that the retention member 482 abuts against surfaces of the retention cavity 486. The retention member 482 may extend generally in a radially direction to secure the positioning member 480 relative to second interface portion 478 of support 468.

Figure 11:
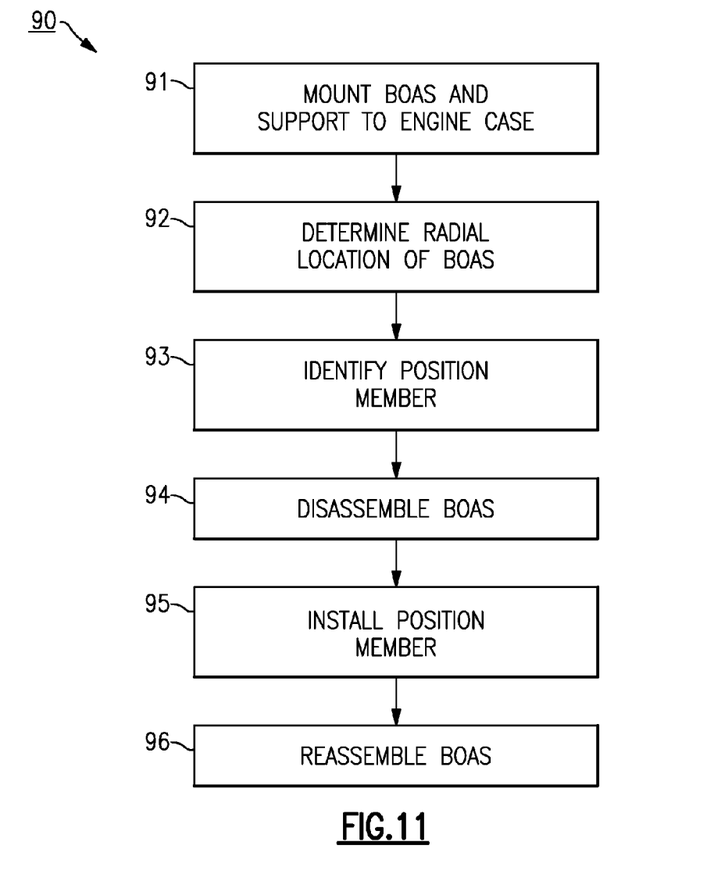
FIG. 11 illustrates a method of assembly for components of a gas turbine engine.

FIG. 11 illustrates a method 90 of assembly for a seal assembly, including any of the seal assemblies described herein. At step 91 a BOAS and support are mounted to an engine case. At step 92 a radial location of sealing surfaces of the BOAS is determined. In some examples, an inspection fixture is assembled onto a reference point, such as a datum snap diameter on the engine case. The inspection fixture may correspond to an expected position of tips of adjacent rotor blades or a predetermined cross sectional profile of the core flow path C. A radial gap between the BOAS and a concentric ring on the inspection fixture is measured to determine a radial position of the BOAS sealing surface 73. In another example, positions of sealing surfaces of the BOAS are determined utilizing a coordinate-measuring machine (CMM). The positions can be compared to the predetermined cross sectional profile of core flow path C.

At step 93 a positioning member is identified. Identification of the positioning member can include selecting a positioning member having a thickness based on a comparison of the measured position of sealing surfaces of the BOAS and a corresponding location of the desired radial position of the BOAS sealing surfaces. Values of the measured position and corresponding location of the predetermined cross sectional profile may differ based on the radial stacking tolerance T of the components affecting the radial position of the BOAS.

At step 94 the BOAS is at least partially disassembled from the engine case. At step 95 the positioning member is installed to situate the sealing surfaces of the BOAS at a desired radial position relative to adjacent rotor blades or the engine axis A of the engine 20. At step 96 the BOAS is reassembled in the same circumferential wheel position in which BOAS was inspected and removed. Steps 91-96 can be repeated or otherwise performed for additional BOAS. In some examples, each position member is unique to a corresponding wheel position of the array of BOAS.

The techniques described herein can be utilized to reduce the need for utilizing assembly grinding or machined-in-case (MIC) techniques to reduce radial variation caused by stack-up tolerances of the seal assembly and establish a desired cross sectional profile of the core flow path C. The BOAS can also be provided with a pre-curved or pre-cupped arcuate geometry to establish an optimum-shape flow path surface that may not be readily achieved by means of assembly grind or MIC techniques. An individual one of the BOAS can be replaced, as opposed to a complete set of BOAS, while maintaining the predetermined cross sectional profile, thereby reducing replacement costs and inventory levels of BOAS. Durability of the BOAS can also be improved since BOAS machining can be optimized for precise control of the hot-wall thickness rather than radial position of BOAS sealing surfaces, thereby reducing oxidation and spallation otherwise caused by material removal to establish a desired geometry of the core flow path C.

It should be understood that relative positional terms such as "forward," "aft," "upper," "lower," "above," "below," and the like are with reference to the normal operational attitude of the vehicle and should not be considered otherwise limiting. Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine, comprising:
    a seal arc segment including a sealing portion that extends in an axial direction between leading and trailing edges and including a first interface portion, the first interface portion defining circumferential mate faces that are spaced apart in a circumferential direction;
    a support including a mounting portion and a second interface portion, the mounting portion configured to be fixedly attached to an engine static structure, and the second interface portion radially inward of the first interface portion;
    wherein the first interface portion is a first hook support, and the second interface portion is a second hook support dimensioned to mate with the first hook support such that the first and second hook supports are opposed in a radial direction and overlap in the axial direction along the respective first and second interface portions; and
    at least one positioning member dimensioned to abut the first and second interface portions such that the first and second interface portions are spaced apart by a predetermined distance in the radial direction.

2. The seal assembly as recited in claim 1, wherein the predetermined distance relates to a stacking tolerance defined in the radial direction by the seal arc segment and the support.

3. The seal assembly as recited in claim 1, wherein the at least one positioning member extends substantially between the mate faces.

4. The seal assembly as recited in claim 1, wherein the at least one positioning member is a first positioning member and a second positioning member, each of the first and second positioning members extending less than half a distance between the mate faces.

5. The seal assembly as recited in claim 4, wherein the first positioning member defines a first radial thickness, and the second positioning member defines a second, different radial thickness.

6. The seal assembly as recited in claim 1, wherein the at least one positioning member includes a retention member extending from an elongated body, and the second interface portion defines a retention cavity configured to receive the retention member, the retention cavity dimensioned to bound relative circumferential movement of the retention member.

7. The seal assembly as recited in claim 1, wherein the predetermined distance varies in the circumferential direction.

8. The seal assembly as recited in claim 2, wherein the at least one positioning member is dimensioned such that the predetermined distance varies in the circumferential direction.

9. The seal assembly as recited in claim 5, wherein first and second radial thicknesses are defined with respect to the radial direction such that the predetermined distance corresponding to the first positioning member differs from the predetermined distance corresponding to the second positioning member.

10. The seal assembly as recited in claim 6, wherein the retention member extends in the radial direction from the elongated body to a terminal end that is received in the retention cavity.

11. A gas turbine engine, comprising:
an engine case extending along an engine axis;
an array of blades rotatable about the engine axis; and
a blade outer air seal assembly adjacent to the array of blades, the blade outer air seal assembly comprising:
an array of blade outer air seals each including a sealing portion and a first interface portion, the sealing portion configured to bound a core flow path;
an array of supports each including a mounting portion and a second interface portion, the mounting portion configured to be fixedly attached to the engine case, and the second interface portion bounding radial movement of an adjacent one of the first interface portions towards the engine axis; and
a plurality of positioning members each received between one of the first and second interface portions such that the corresponding sealing portion is radially spaced from the engine axis by a predetermined distance; and
wherein the array of blade outer air seals includes a first seal and a second seal, the predetermined distance of the first seal differing from the predetermined distance of the second seal.

12. The gas turbine engine as recited in claim 11, wherein the predetermined distance relates to a radial stacking tolerance defined by the engine case and the blade outer air seal assembly.

13. The gas turbine engine as recited in claim 12, wherein the predetermined distance relates to a clearance gap between one of the array of blade outer air seals and an adjacent one of the array of blades.

14. The gas turbine engine as recited in claim 11, wherein the predetermined distance of at least one of the array of blade outer air seals varies in a circumferential direction relative to the engine axis.

15. The gas turbine engine as recited in claim 11, wherein the array of blade outer air seals is arranged such that a cross section of the core flow path taken relative to the engine axis has a non-circular elliptical geometry.

16. The gas turbine engine as recited in claim 11, wherein the first interface portion is a first hook support, and the second interface portion is a second hook support dimensioned to mate with the first hook support.

17. The gas turbine engine as recited in claim 11, wherein one of the array of blade outer air seals includes a third interference portion axially aft of the first interface portion, one of the array of supports includes a fourth interface portion bounding radial movement of the third interface portion towards the engine axis, and a second positioning member is received between the third and fourth interface portions, a thickness of the second positioning member being different from a thickness of a corresponding one of the plurality of positioning members positioned adjacent to the first interface portion.

18. A method of sealing of a gas turbine engine, comprising:
providing a blade outer air seal including a sealing portion and a first interface portion, the sealing portion configured to bound a flow path;
providing a support including a mounting portion and a second interface portion, the second interface portion configured to bound radial movement of the first interface portion toward an engine axis;
attaching the mounting portion to an engine case, the engine case arranged about the engine axis;
where a radial stacking tolerance is defined by the engine case, the blade outer air seal in a radial direction relative to the engine axis;
selecting a positioning member based on the radial stacking tolerance; and
situating the positioning member between the first and second interface portions such that the sealing portion is radially spaced from the engine axis by a predetermined distance relating to the radial stacking tolerance.

19. The method as recited in claim 18, wherein the positioning member is dimensioned such that the predetermined distance varies in a circumferential direction relative to the engine axis.

20. The method as recited in claim 18, comprising slideably moving the first interface portion relative to the second interface portion to secure the blade outer air seal to the support.

21. The method as recited in claim 20, wherein the sealing portion extends in an axial direction between leading and trailing edges with respect to the engine axis, the first interface portion is a first hook support, and the second interface portion is a second hook support dimensioned to mate with the first hook support, the step of slideably moving first interface portion relative to the second interface portion includes the first and second hook supports being opposed in the radial direction and overlapping in the axial direction along the first and second interface portions.

22. The method as recited in claim 20, wherein the blade outer air seal is an array of blade outer air seals including a first seal and a second seal, and the step of situating the positioning member includes the predetermined distance of the first seal differing from the predetermined distance of the second seal.

* * * * *